United States Patent
Haj-Maharsi et al.

(10) Patent No.: US 8,704,390 B2
(45) Date of Patent: Apr. 22, 2014

(54) DYNAMIC ADJUSTMENT OF POWER PLANT OUTPUT BASED ON ELECTRICAL GRID CHARACTERISTICS

(75) Inventors: Mohamed Haj-Maharsi, Houston, TX (US); Sunita Singh, Houston, TX (US); Kent Hans Søbrink, Middelfart (DK)

(73) Assignee: Vestas Wind Systems A/S, Aarhus N (DK)

(*) Notice: Subject to any disclaimer, the term of this patent is extended or adjusted under 35 U.S.C. 154(b) by 600 days.

(21) Appl. No.: 12/962,218

(22) Filed: Dec. 7, 2010

(65) Prior Publication Data
US 2012/0139241 A1 Jun. 7, 2012

(51) Int. Cl.
F03D 9/00 (2006.01)
(52) U.S. Cl.
USPC ............................................. 290/44; 290/43
(58) Field of Classification Search
USPC .......................................... 290/43, 44, 54, 55
See application file for complete search history.

(56) References Cited

U.S. PATENT DOCUMENTS

| | | | |
|---|---|---|---|
| 7,042,110 B2 * | 5/2006 | Mikhail et al. ................... | 290/44 |
| 7,071,579 B2 * | 7/2006 | Erdman et al. ................... | 290/55 |
| 8,008,793 B2 * | 8/2011 | Andresen .......................... | 290/44 |
| 8,046,109 B2 * | 10/2011 | Larsen et al. .................. | 700/293 |
| 8,154,141 B2 * | 4/2012 | Andresen .......................... | 290/44 |
| 8,334,606 B2 * | 12/2012 | Oohara et al. ................... | 290/44 |
| 2012/0049516 A1 * | 3/2012 | Viassolo .......................... | 290/44 |

FOREIGN PATENT DOCUMENTS

| | | |
|---|---|---|
| EP | 1790850 A1 | 5/2007 |
| EP | 1914419 A1 | 4/2008 |

OTHER PUBLICATIONS

Wang et al., "Contribution of VSC-HVDC connected wind farms to grid requency regulation and power damping", 36th Annual Conference on IEEE Industrial Electronics Society, Piscataway, NJ Nov. 7, 2010, Sections II and IV.
Fazeli, et al., "Wind turbine-energy storage control system for delivering constant demand power shared by DFIGs through droop characteristics", 13th European Conference on Power Electronics and Applications, 2009.
Ramtharan, et al., "Fault ride through of fully rated converter wind turbines with AC and DC transmission systems", IET Renewable Power Generation, vol. 3, No. 4, Jul. 9, 2012.
Xiang et al., "Coordinated Control of an HVDC Link and Doubly Fed Induction Generators in a Large Offshore Wind Farm", IEEE Transactions on Power Delivery, IEEE Service Center, New York, NY vol. 21, No. 1, Jan. 1, 2006.
European Patent Office, Written Opinion of the International Searching Authority issued in related International Application No. PCT/DK2011/050464 dated May 18, 2012.

* cited by examiner

*Primary Examiner* — Nicholas Ponomarenko
(74) *Attorney, Agent, or Firm* — Patterson & Sheridan, LLP (57) ABSTRACT

Method, power plant, and computer program product for use in controlling power output by a power plant. The power plant includes a wind farm with a plurality of wind turbines, a grid power converter (such as one or more HVDC links), a sensor to measure the frequency of a power grid, and a supervisory controller. The supervisory controller implements a control algorithm that adjusts the power output from the power plant in response to the frequency of the power grid dropping below a first target frequency by changing the pitch of the blades of at least one wind turbine, increasing the level of a portion of the power contributed by at least one wind turbine, or increasing the level of the power output by the grid power converter.

25 Claims, 6 Drawing Sheets

DYNAMIC ADJUSTMENT OF POWER PLANT OUTPUT BASED ON ELECTRICAL GRID CHARACTERISTICS

BACKGROUND

This application relates generally to electrical power generation and, more specifically, to methods, systems, and computer program products for use in adjusting the power output therefrom.

A wind farm, or wind park, includes a group of wind turbines that operate collectively as a power plant that generates a power output to a power grid. Wind turbines can be used to produce electrical energy without the necessity of fossil fuels. Generally, a wind turbine is a rotating machine that converts the kinetic energy of the wind into mechanical energy and the mechanical energy subsequently into electrical power. Conventional horizontal-axis wind turbines include a tower, a nacelle located at the apex of the tower, and a rotor that is supported in the nacelle by a shaft. A generator, which is housed inside the nacelle, is coupled by the shaft with the rotor. Wind currents activate the rotor, which transfers torque to the generator. The generator produces electrical power that is eventually output to the power grid.

Due to the natural intermittency of wind as well as outages that occur when a transmission line from a wind turbine or the wind turbine itself fails, the power output from a particular wind turbine or wind farm is less consistent than the power output from conventional fossil fuel-fired power plants. As a result, the power from wind turbines operating at nominal conditions in a wind farm may not meet output requirements for the power grid, resulting in decreasing frequency of the power grid. For example, the power from the wind power plant often will not track the forecasted power due to wind forecast, transmission line, or wind turbine errors. As another example, the rate of change of power for a wind power plant may be outside of a desired range because of wind gusts. A conventional approach for dealing with these and other similar situations is to use wind turbine controls to manage the operation of the wind farm, such as utilizing pitch control of the rotor blades to increase or decrease, within some limits, the power produced by the individual wind turbines, as well as using a braking system to decrease, within some limits, the power produced by the individual wind turbines.

Moreover, due to loads being added and withdrawn to the power grid, the power output from a particular wind turbine or wind farm needs to be adjusted to maintain the power grid at its nominal ranges for power and frequency, to name some examples. As a result, the power from wind turbines may not meet output requirements for the power grid. For example, a load may be added to the power grid and result in decreasing frequency of the power grid. On the other hand, a sudden withdrawal of a load may result in increasing frequency of the power grid. Although some conventional systems simply result to load shedding (to increase the frequency of the power grid if it decreases beyond a predetermined threshold) or generator shedding (to decrease the frequency of the power grid if it increases beyond another predetermined threshold), a more conventional approach for dealing with these and other similar situations is to again use wind turbine controls to manage the operation of the wind farm, such as utilizing pitch control of the rotor blades to increase or decrease, within some limits, the power produced by the individual wind turbines.

As such, wind turbines are operated in a curtailed mode. In the curtailed mode, the wind turbines are not generating all the power available from the wind or otherwise available. The difference between the power being generated and the maximum power available, or "control margin," may be fairly wide, such as about 0.5 MW wide, and used for emergency additional power output.

An increase or decrease in the frequency of a power grid often occurs in fractions of a second. Changing the pitch of the blades to adjust the operation of the wind turbine in the curtailed mode often takes no less than seconds, as there is a delay associated with determining or otherwise communicating a command to a wind turbine to adjust the pitch of the blades as well as a delay for any pitch adjustment mechanisms to actually change the pitch of the blades. Furthermore, there is a delay associated with the increase or decrease in speed of the blades of the wind turbine in response to the adjustment of the pitch of the blades, and thus a delay when the actual power output of a wind turbine increases or decreases. Moreover, operating a wind turbine in a curtailed mode necessarily results in the wind turbine producing less power than that which would be available. Specifically, the curtailed mode may require that brakes be applied to the wind turbine to maintain the power generation within the middle of the control margin. Still further, the operation of the wind turbines at slower than capable speeds often increases the stress on the blades, rotors, and other mechanical components of the wind turbines. This results in increased wear on wind turbine components as well as increased costs for maintenance, replacement, and operation.

Improved methods, systems, and computer program products are needed for coordinating the generation of power by wind turbines in a wind farm.

BRIEF SUMMARY

Generally, the control algorithms of the embodiments of the invention receive information on the frequency of a power grid that receives power from a power plant, and adjusts the level of power output by the power plant when the frequency falls too low or rises too high.

In an embodiment of the invention, a power plant is provided for controlling power output to a power grid. The power plant includes a wind farm with a plurality of wind turbines configured to generate and output a wind farm power signal to a point of common connection, each wind turbine including a pitch mechanism to control the pitch of the blades of the respective wind turbine and a turbine power converter to output a portion of the wind farm power signal generated by the respective wind turbine. The power plant also includes a grid power converter connected to the point of common connection and configured to receive the wind farm power signal and output a power signal for the power grid, as well as a sensor to measure a frequency of the power grid. The power plant further includes a supervisory controller coupled in communication with each of the wind turbines of the wind farm, the grid power converter, and the sensor. The supervisory controller is configured to implement a control algorithm that is in turn dynamically adjusts the power signal in response to the frequency measured by the sensor dropping below a predetermined frequency. The control algorithm dynamically adjusts the power signal by changing the pitch of the blades of at least one respective wind turbine of the wind farm, increasing the level of the portion of the wind farm power signal output by the turbine power converter of at least one respective wind turbine of the wind farm, and increasing the level of the power signal output by the grid power converter.

In another embodiment of the invention, a computer-implemented method is provided for controlling the power output by a power plant to a power grid. The power plant is of the type that includes a wind farm that outputs a wind farm power signal and a grid power converter that receives the wind farm power signal and outputs a power signal for the power grid. The method comprises, in response to a measured frequency of the power grid dropping below a first target frequency, using a control algorithm to dynamically adjust the power signal by changing the pitch of the blades of at least one respective wind turbine of the wind farm, increasing the level of a portion of the wind farm power signal output by a turbine power converter of at least one respective wind turbine of the wind farm, and increasing the level of the power signal output by the grid power converter.

The method may be implemented as a computer program product in which instructions for performing the method are stored on a computer readable storage medium.

BRIEF DESCRIPTION OF THE SEVERAL VIEWS OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
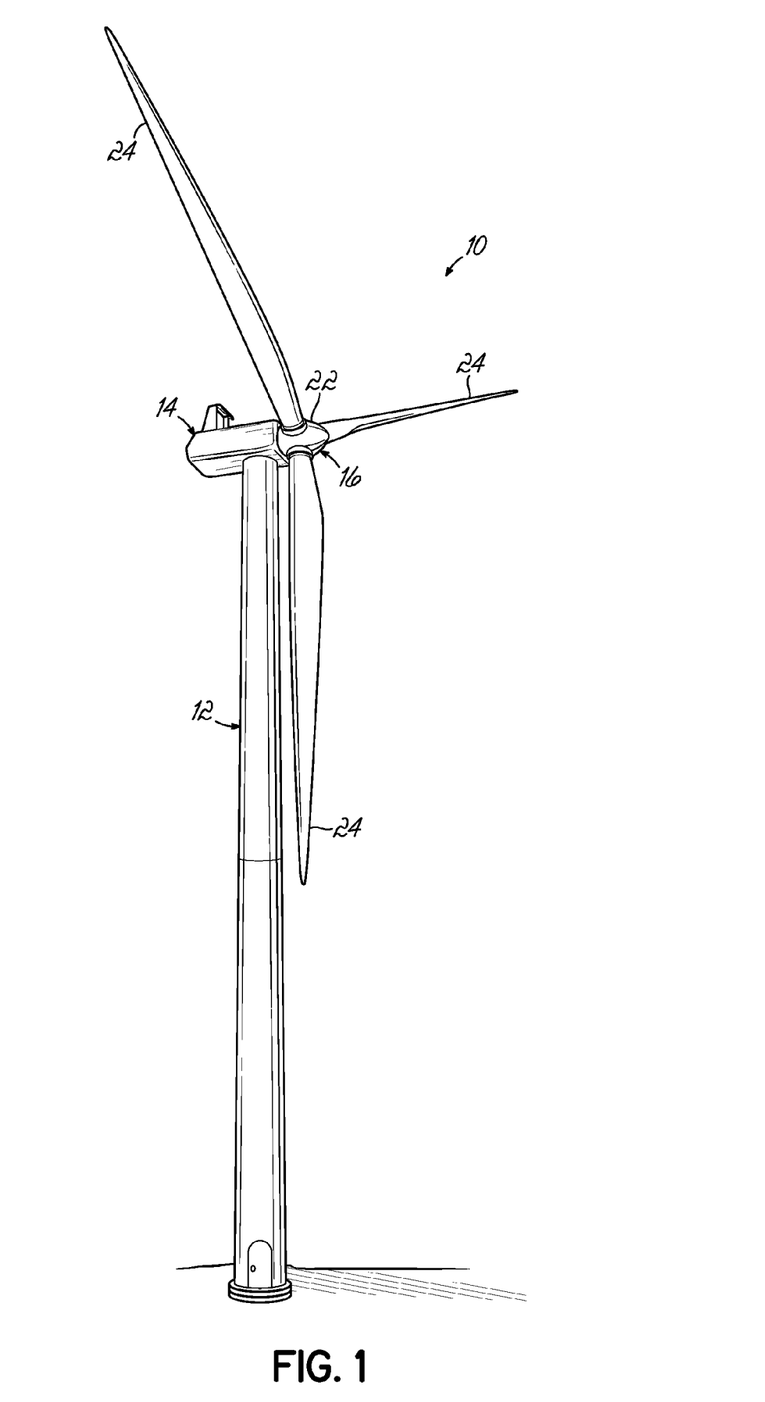
FIG. 1 is a perspective view of a wind turbine.
Figure 2:
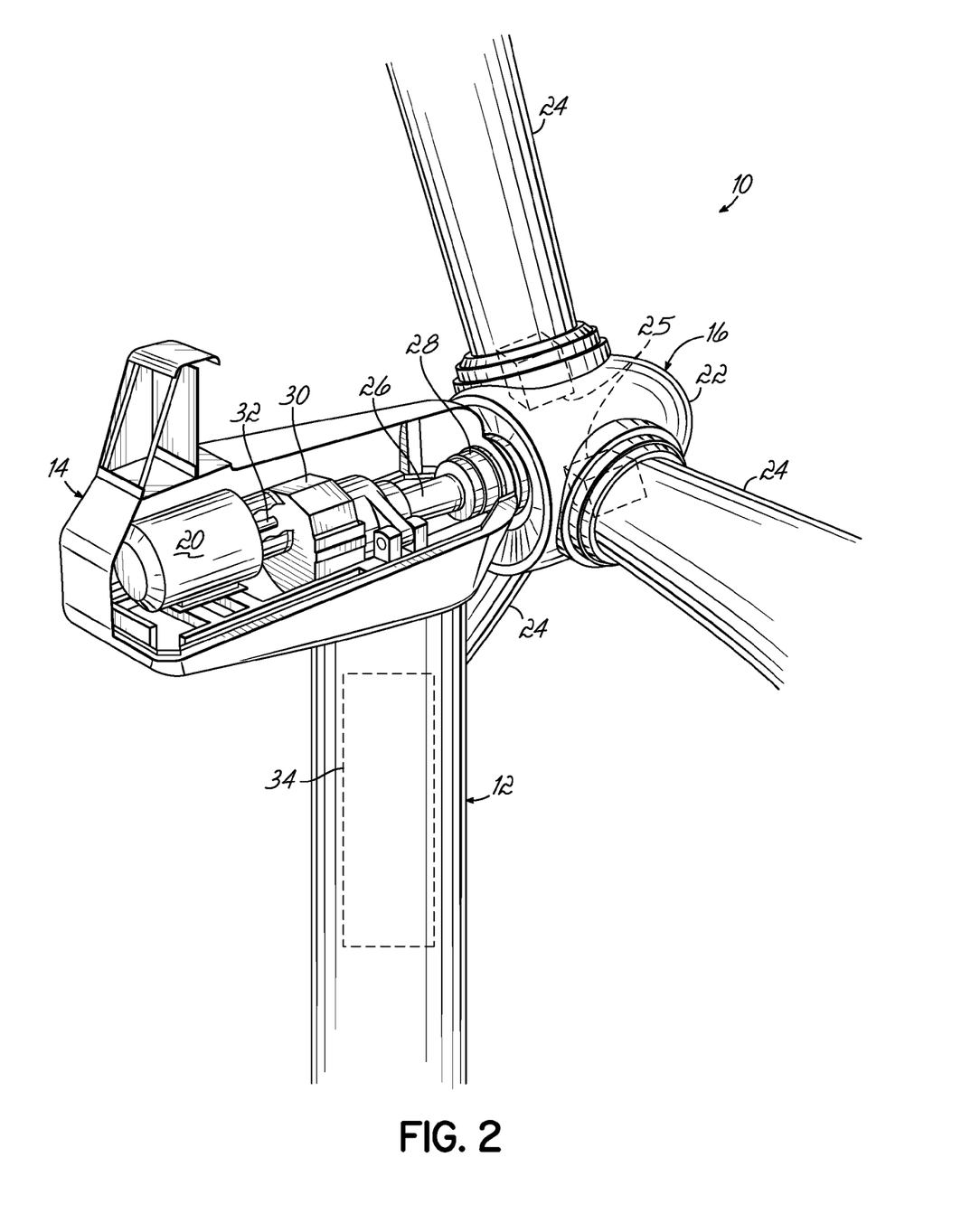
FIG. 2 is a perspective view of a portion of the wind turbine of FIG. 1 in which the nacelle is partially broken away to expose structures housed inside the nacelle.

With reference to FIGS. 1 and 2 and in accordance with an embodiment of the invention, a wind turbine 10, which is depicted as a horizontal-axis machine, includes a tower 12, a nacelle 14 disposed at the apex of the tower 12, and a rotor 16 operatively coupled to a generator 20 housed inside the nacelle 14. In addition to the generator 20, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 on an underlying foundation. The tower 12 of the wind turbine 10 also operates to elevate the nacelle 14 and rotor 16 to a height above ground level or sea level, as may be the case, at which faster moving air currents of lower turbulence are typically found.

Figure 3:
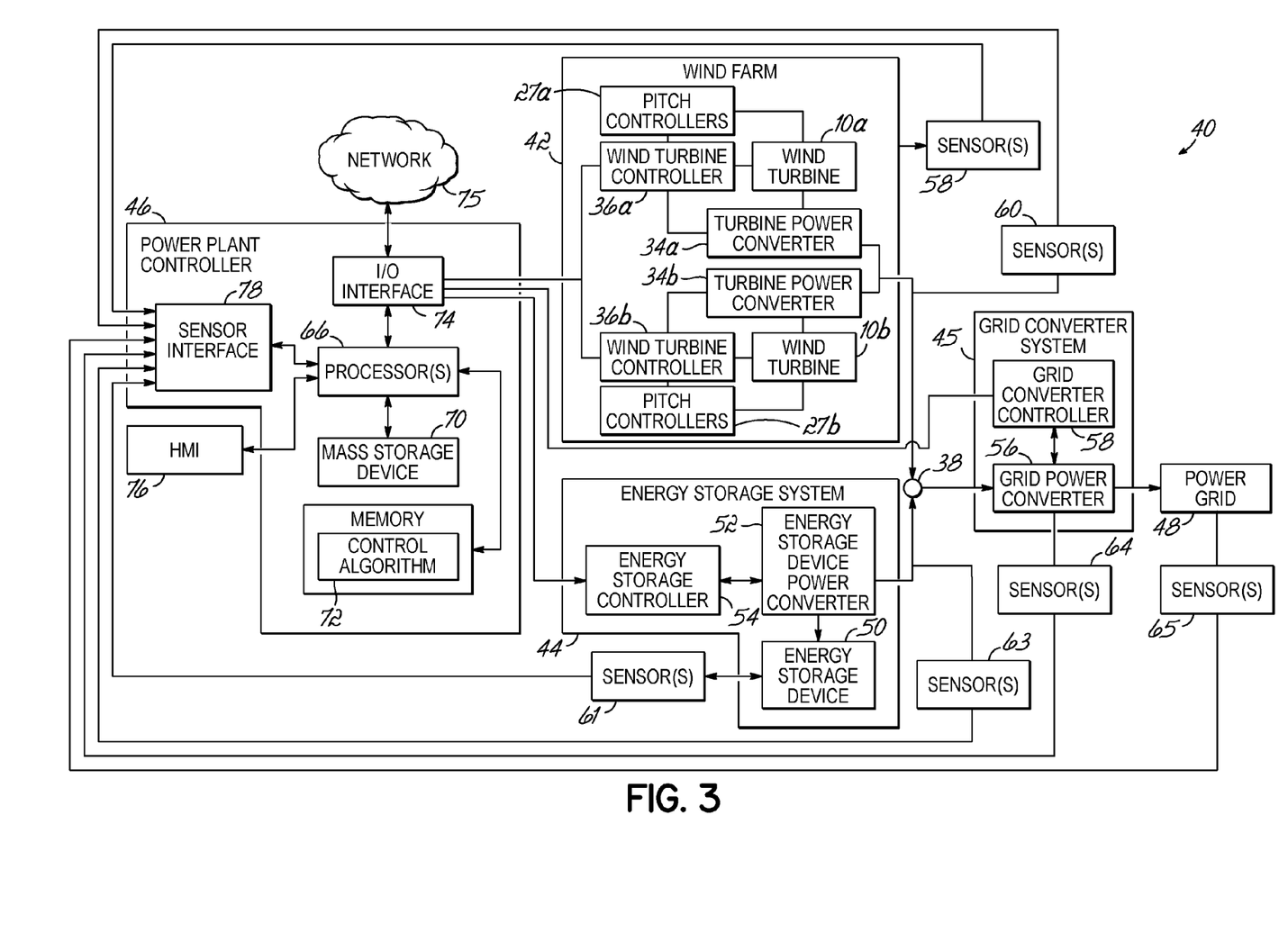
FIG. 3 is a diagrammatic view of power plant that includes a wind farm with multiple wind turbines like the wind turbine of FIGS. 1 and 2, an energy storage device, and a power plant controller in accordance with an embodiment of the invention.

The rotor 16 includes a central hub 22 and a plurality of blades 24 attached to the central hub 22 at locations circumferentially distributed about the central hub 22. In the representative embodiment, the rotor 16 includes a plurality of three blades 24 but the number may vary. The blades 24, which project radially outward from the central hub 22, are configured to interact with the passing air currents to produce aerodynamic lift that causes the central hub 22 to spin about its longitudinal axis. The design, construction, and operation of the blades 24 are familiar to a person having ordinary skill in the art. For example, each of the blades 24 is connected to the central hub 22 and coupled to a blade pitch control mechanism 25 (or, more simply, "pitch mechanism" 25) that allows the blade 24 to pitch. The pitch mechanisms 25 are, in turn, under control of one or more pitch controllers 27 (FIG. 3). The nacelle 14 and rotor 16 are coupled by a bearing with the tower 12 and a motorized yaw system (not shown) is used to maintain the rotor 16 aligned with the wind direction.

A low-speed drive shaft 26 is mechanically coupled at one end with the central hub 22 of the rotor 16 and extends into the nacelle 14. The low-speed drive shaft 26 is rotatably supported by a main bearing assembly 28 coupled to the framework of the nacelle 14. The low-speed drive shaft 26 is coupled to a gear box 30 having as an input the low-speed drive shaft 26, and having as an output a high-speed drive shaft 32 that is operatively coupled to the generator 20. The generator 20 may be any type of synchronous generator or asynchronous generator as recognized by a person having ordinary skill in the art and is generally understood to be a rotating electrical machine that converts mechanical energy into electrical energy by creating relative motion between a magnetic field and a conductor. The output of the generator 20 is coupled to a turbine power converter 34 to receive the AC voltage generated by the generator 20 of the wind turbine 10 and supply an AC voltage to an energy storage system 44 and/or a grid converter system 45 (FIG. 3) through a point of common connection 38.

Wind exceeding a minimum level activates the rotor 16 and causes the blades 24 to rotate in a plane substantially perpendicular to the wind direction. The positive torque transferred from the rotor 16 to the generator 20 causes the generator 20 to convert the mechanical energy into AC electrical power so that the kinetic energy of the wind is harnessed for power generation by the wind turbine 10. The wind turbine 10 is characterized by a power curve describing the output power generated as a function of wind speed and the wind turbine 10 is operated with recognition of cut-in, rated, and cut-out wind speeds.

With reference to FIG. 3, a power plant 40 includes a wind park or wind farm 42 containing a group of wind turbines 10a, 10b sited at a common physical location, an energy storage system 44, and a grid converter system 45, as well as a power plant controller 46 that provides supervisory control over the power plant 40. The power plant 40, and in particular the grid converter system 45 of the power plant 40, is electrically coupled with a power grid 48, which may be a three-phase power grid. The wind turbines 10a, 10b each have a construction similar or identical to the construction of the representative wind turbine 10. The wind farm 42 may contain additional wind turbines (not shown) like the representative wind turbines 10a, 10b such that the total number of wind turbines in the wind farm 42 is arbitrary within reason. In various embodiments, the wind farm 42 may include from ten (10) to one hundred (100) wind turbines distributed over tens of square kilometers of land and/or sea area.

A turbine power converter 34a, 34b is configured to receive the AC voltage generated by the generator 20 of each of the respective wind turbines 10a, 10b and to supply an AC voltage to the energy storage system 44 and/or the grid converter system 45 through the point of common connection 38. Each of the wind turbines 10a, 10b includes a respective wind turbine controller 36a, 36b that manages the operation of the wind turbine components and subsystems by implementing, for example, pitch controls, yaw controls, generator controls, turbine power converter controls, etc. In one aspect of turbine management, each of the wind turbine controllers 36a, 36b is coupled in communication with a respective one of the turbine power converters 34a, 34b and generates controls signals to control the power output by the turbine power converter 34a, 34b. In response to the control signals, each turbine power converter 34a, 34b rectifies the AC voltage from a respective generator 20 of the wind turbine 10a, 10b to obtain a filtered DC voltage, dynamically adjusts the level of the filtered DC voltage, and then converts the DC voltage to an AC voltage at a desired constant frequency (e.g., 50 Hz or 60 Hz) that is output as three-phase alternating current (AC) to the energy storage system 44 and the grid converter system 45. The wind turbine controllers 36a, 36b may control the functions of other sub-controllers that locally control parts of each wind turbine 10a, 10b, such as the pitch control 27 over the blades 24 of the rotor 16.

The energy storage system 44 includes an energy storage device 50, an energy storage device power converter 52, and an energy storage controller 54 that manages the operation of the energy storage device power converter 52. The energy storage device 50 is coupled with the grid converter system 45 and is in parallel arrangement with the generators 20 of the wind turbines 10a, 10b in wind farm 42. The energy storage controller 54 is coupled in communication with the energy storage device power converter 52 and generates controls signals that are supplied as commands to the energy storage device power converter 52.

In the representative embodiment, the energy storage device 50 includes one or more rechargeable batteries. Exemplary batteries may be based upon electro-chemical storage batteries and include, but are not limited to, lead-acid, lithium ion, and vanadium redox batteries. Other exemplary batteries include, but are not limited to, metal-air, nickel-cadmium, sodium-sulfur, and zinc-bromine batteries. In alternative embodiments, the energy storage device 50 may be a different type of device, such as a flywheel or a bank of capacitors (such as electro-chemical capacitors), capable of receiving and stably storing electrical energy, and also capable of discharging the stored electrical energy under the control of the power plant controller 46. In another alternative embodiment, the energy storage device 50 may be hybrid in the sense that energy storage device 50 may include devices of different types, such as one or more flywheels, one or more banks of capacitors, one or more rechargeable batteries, or combinations of these devices.

The energy storage controller 54, in conjunction with the wind turbine controllers 36a, 36b, controls the ability of the energy storage device 50 to receive and store energy from the wind turbines 10a, 10b in wind farm 42. Excess energy produced by the wind turbines 10a, 10b may be stored in the energy storage device 50. In response to control signals from the respective wind turbine controllers 36a, 36b, the turbine power converters 34a, 34b are configured to divert electrical energy produced by the generators 20 of the wind turbines 10, 10b to the energy storage device power converter 52 of the energy storage device 50. The energy storage device power converter 52 is configured to convert the AC voltage(s) from the turbine power converters 34a, 34b of the respective wind turbines 10a, 10b of the wind farm 42 into a DC voltage, adjust the voltage level of the DC voltage for compatibility with the energy storage device 50, and route the DC voltage to the energy storage device 50, which stores the electrical energy contained in the DC voltage.

At the direction of control signals received from the energy storage controller 54, the energy storage device power converter 52 may be directed to discharge stored energy in a controlled manner as DC voltage from the energy storage device 50 to the energy storage device power converter 52. The energy storage device power converter 52, which may be similar to turbine power converters 34a, 34b, is configured to receive the DC voltage output from the energy storage device 50, filter the DC voltage, and then convert the filtered DC voltage to an AC voltage at the appropriate constant frequency. The AC voltage is then output from the energy storage system 44 as three-phase AC power to the grid converter system 45.

The grid converter system 45 includes a grid power converter (HVDC link) 56 and a grid converter controller 58 that manages the operation of the grid power converter (HVDC link) 56. The grid power converter (HVDC link) 56 is configured to receive the AC voltage(s) from the wind farm 42 and/or energy storage system 44, convert the AC voltage from the wind farm 42 and/or the AC voltage from the energy storage system 44 to obtain a filtered DC voltage, dynamically adjust the level of the filtered DC voltage such that a high-voltage DC (HVDC) signal is produced, and then convert the HVDC signal to an AC voltage at a desired constant frequency that is output as three-phase AC to the power grid 48.

The power plant controller 46 is connected in communication with the wind turbine controllers 36a, 36b in the wind farm 42. Wind interacts with the wind turbines 10a, 10b, as explained above, to generate electrical power from the torque supplied from the rotor 16 to the generator 20. Control signals from the power plant controller 46 are used by each of the wind turbine controllers 36a, 36b to dynamically vary the output of the respective of the wind turbines 10a, 10b in wind farm 42 to meet certain output requirements on the generated electrical power. In response to a control signal received from the power plant controller 46, each of the wind turbine controllers 36a, 36b can, for example, control the yaw of the nacelle 14 and rotor 16. Also in response to a control signal received from the power plant controller 46, each of the wind turbine controllers 36a, 36b can control a respective pitch controller 27a, 27b to control the pitch of the blades 24 to limit the rotational speed of the respective wind turbine 10a, 10b. Moreover, in response to a control signal received from the power plant controller 46, each of the wind turbine controllers 36a, 36b can, for example, control the operation of the respective turbine power converters 34a, 34b to adjust the AC voltage output by the respective wind turbines 10a, 10b.

The power plant controller 46 is also connected in communication with the energy storage controller 54 serving the energy storage system 44. Control signals from the power plant controller 46 are used by the energy storage controller 54 to regulate the operation of the energy storage device 50 and the energy storage device power converter 52. In particular, the control signals from the power plant controller 46 are used to regulate the discharge of energy from the energy storage device 50 of the energy storage system 44 and the charging of the energy storage device 50.

The power plant controller 46 is configured to control an amount of electrical power output from the power plant 40 to the power grid 48. As such, the power plant controller 46 is connected in communication with the grid converter system 45. Control signals from the power plant controller 46 are used by the grid converter controller 58 to regulate the operation of the grid power converter (HVDC link) 56. In response to a control signal received from the power plant controller 46, the grid converter controller 58 may, for example, control the operation of the grid power converter (HVDC link) 56 to adjust the AC voltage output to the power grid 48. The power output from the power plant 40 typically includes a contribution from each of the wind turbines 10 in the wind farm 42 and may include a contribution from the energy storage system 44, although the energy storage system 44 may consume power when charging. The grid power converter (HVDC link) 56 may include a transformer to increase the voltage of the electrical current arriving from the wind farm 42 and/or energy storage system 44 for connection over high-voltage transmission lines to the power grid 48.

At least one sensor 60 measures time-varying data from the wind turbines 10 in the wind farm 42 to provide information for variables relating to the operation of those wind turbines 10. The at least one sensor 60 can monitor various measurable parameters and may include wind sensors, sensors for the mechanical operation of the wind turbines 10, voltage sensors, current sensors, pitch sensors, and/or any other sensor detecting data relevant for the functioning of the wind turbines 10 (including the generator 20 and/or turbine power converter 35, for example) or data from the environment of the wind turbines 10. The state information from the least one sensor 60 is communicated to the power plant controller 46 and is correlated at the power plant controller 46 with the state of the wind farm 42.

At least one other sensor 61 measures time-varying data from the energy storage system 44 to generate time-varying information for variables relating to the operation of the energy storage device 50. The at least one sensor 61 can monitor various measurable parameters of the energy storage device 50 and may include voltage sensors, current sensors, and/or any other sensor detecting data relevant for the functioning of the energy storage system 44 (including the energy storage device 50 and the energy storage device power converter 52, for example). The state information from the least one sensor 61 is communicated to the power plant controller 46 and is correlated at the power plant controller 46 with the state of the energy storage system 44.

In addition to at least one sensor 60, 61 to measure information from the wind farm 42 and/or energy storage system 44, the power plant 40 may include additional sensors 62, 63, 64 to measure AC voltages from the wind farm 42, the energy storage system 44, and the grid converter system 45. Specifically, at least one sensor 62 measures data for variables relating to the actual time-varying power output from the wind farm 42 to the point of common connection 38, at least one sensor 63 measures data for variables relating to the actual time-varying power output from the energy storage system 44 to the point of common connection 38, and at least one sensor 64 measures data for variables relating to the actual time-varying power output from the grid converter system 45 and thus the power plant 40. The actual time-varying power output from the power plant 40 during periods of power production includes contributions from the time-varying powers of the wind farm and energy storage system. The time-varying powers may include reactive and active components. The sensors 62, 63, 64 can include voltage sensors for measuring voltage as a variable, current sensors for measuring current as a variable, and/or any other sensor detecting data for variables relevant to power detection and measurement. The data from the sensors 62, 63, 64 can be communicated to the power plant controller 46 and continuously updated for computation of the time-varying powers at different instants in time for implementing the real-time control schemes of the embodiments of the invention.

The power plant controller 46 is further configured to monitor the power grid 48 for imbalances, such as the frequency of AC signals within the power grid falling outside of a specified range. The power plant 40 is configured to maintain the power grid 48 at a desired, or utility, frequency (e.g., 50 Hz or 60 Hz). When extra demand or load is introduced to the power grid 48, the frequency may decrease. When demand or load is removed from the power grid 48, the frequency may increase. Excessive deviation from the utility frequency, however, may cause failure of at least a portion of the power grid 48 or damage to electricity conversion and/or electricity consuming devices connected to the power grid 48. As such, the power plant controller 46 is configured to monitor the power grid 48 through at least one sensor 65 and to control the components of the power plant 40 to adjust the AC voltage supplied to the power grid 48 when there are imbalances. Consistent with embodiments of the invention, the power plant controller 46 is configured to dynamically adjust the operation of one or more of a wind turbine 10a, 10b, energy storage system 44, or grid converter system 45 in response to an imbalance in the power grid 48.

The power plant controller 46 is a supervisory control system that can be implemented using at least one processor 66 selected from microprocessors, micro-controllers, micro-computers, digital signal processors, central processing units, field programmable gate arrays, programmable logic devices, state machines, logic circuits, analog circuits, digital circuits, and/or any other devices that manipulate signals (analog and/or digital) based on operational instructions that are stored in a memory 68. The memory 68 may be a single memory device or a plurality of memory devices including but not limited to random access memory (RAM), volatile memory, non-volatile memory, static random access memory (SRAM), dynamic random access memory (DRAM), flash memory, cache memory, and/or any other device capable of storing digital information. The power plant controller 46 includes a mass storage device 70 may include one or more hard disk drives, floppy or other removable disk drives, direct access storage devices (DASD), optical drives (e.g., a CD drive, a DVD drive, etc.), and/or tape drives, among others.

The processor 66 of the power plant controller 46 operate under the control of an operating system, and executes or otherwise relies upon computer program code embodied in various computer software applications, components, programs, objects, modules, data structures, etc. The computer program code residing in memory 68 and stored in the mass storage device 70 also includes a control algorithm 72 that, when executing on the processor 66, controls and manages the power output to the power grid 48 by using numerical calculations and operational logic to control the power output from the power system 40. The computer program code typically comprises one or more instructions that are resident at various times in memory 68, and that, when read and executed by the processor 66, causes the power plant controller 46 to perform the steps necessary to execute steps or elements embodying the various embodiments and aspects of the invention.

Various program code described herein may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

For purposes of energy management and regulatory controls, the power plant controller 46 can be configured with an input/output (I/O) interface 74 to receive various types of input data from sources external to the power plant 40 through an applicable network 75 such as, for example, a local area network (LAN), a wide area network (WAN), the Internet, a wireless network, etc., employing a suitable communication protocol. In particular, the power plant controller 46 may receive a global set point for power production from an external source, such as a SCADA, over the network 75 using an appropriate SCADA protocol.

The power plant controller 46 includes a human machine interface (HMI) 76 that is operatively connected to the processor 66 in a conventional manner. The HMI 76 may include output devices, such as alphanumeric displays, a touch screen, a speaker, and other visual or audible indicators, as well as input devices and controls, such as an alphanumeric keyboard, a pointing device, keypads, pushbuttons, control knobs, etc., capable of accepting commands or input from the operator.

The power plant controller 46 includes a sensor interface 78 that allows the power plant controller 46 to communicate with the sensors 60, 61, 62, 63, 64, 65. The sensor interface 78 may be or may comprise one or more analog-to-digital converters configured to convert analog signals from the sensors 60, 61, 62, 63, 64, 65 into digital signals for use by the processor 66 of the power plant controller 46.

Figure 4:
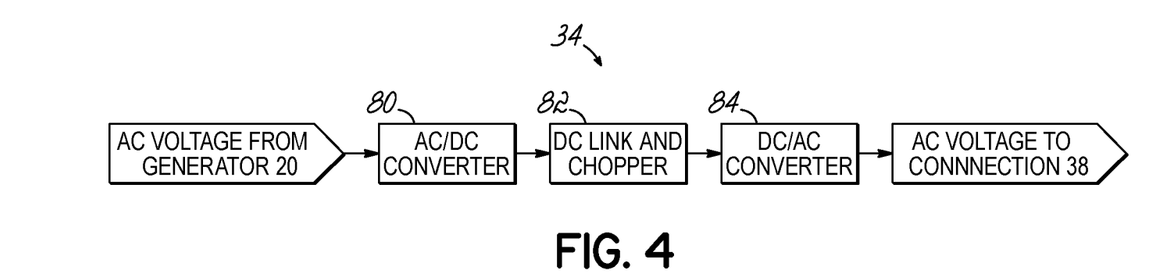
FIG. 4 is a diagrammatic view of a power converter for the wind turbine of FIGS. 1 and 2.
Figure 5:
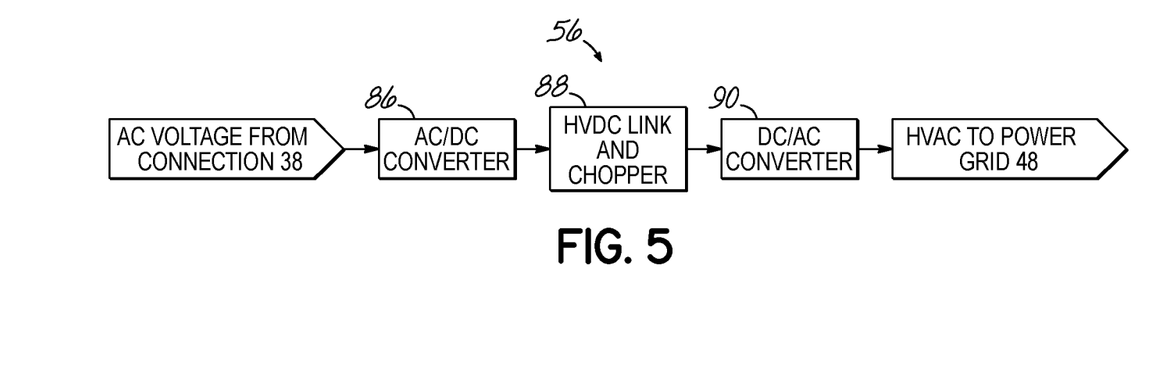
FIG. 5 is a diagrammatic view of a power converter for the power plant of FIG. 3.

FIGS. 4 and 5 show a turbine power converter 34 and a grid power converter (HVDC link) 56, respectively. In particular, the turbine power converter 34 includes an AC-to-DC voltage converter 80 coupled to the generator 20 of a wind turbine 10 to filter and convert an AC voltage generated thereby into a filtered DC voltage. The filtered DC voltage is then level adjusted by a DC link and chopper circuit 82. The DC link and chopper circuit 82 is a dynamically adjustable variable gain chopper circuit that has an about ±30% over/under voltage capacity from a normal, rated voltage at which it is configured to maintain the filtered DC voltage. Thus, in response to control signals from the power plant controller 46, the DC link and chopper circuit 82 may be operated to increase the DC voltage output thereby by about 30% (e.g., increase the gain from input to output) or to decrease the DC voltage output thereby by about 30% (e.g., decrease the gain from input to output). In any event, the DC voltage output by the DC link and chopper circuit 82 to a DC-to-AC converter 84, where it is converted to an AC signal and output to the point of common connection 38.

The grid power converter (HVDC link) 56 is similar to the turbine power converter 34 but, as it typically receives signals from multiple wind turbines, includes components capable of dealing with higher voltages than those components of the turbine power converter 34. The grid power converter (HVDC link) 56 includes an AC-to-DC converter 86 coupled to the point of common connection 38. The AC-to-DC converter 86 is configured to filters and converts an AC voltage into a filtered high-voltage DC (HVDC) signal, which is subsequently level adjusted by a HVDC link and chopper circuit 88. The HVDC link and chopper circuit 88 is a dynamically adjustable variable gain chopper circuit which also has an about ±30% over/under voltage capacity from a normal, rated voltage at which it is configured to maintain the filtered HVDC signal. In response to control signals from the power plant controller 46, the HVDC link and chopper circuit 88 may be operated to increase the HVDC output thereby by about 30% (e.g., increase the gain from input to output) or to decrease the HVDC output thereby by about 30% (e.g., decrease the gain from input to output). In any event, the HVDC output from the HVDC link and chopper circuit 88 is converted to an AC signal (i.e., a high-voltage AC signal) for the power grid 48 by a DC-to-AC converter 90.

In operation, the control algorithm 72 executing on the power plant controller 46 allows the power plant controller 46 to respond to imbalances in the power grid 48 by adjusting the power generation or production from at least one of the wind farm 42, the energy storage system 44, and the grid converter system 45. In one embodiment, the power plant controller 46 adjusts the power generation or production of all the wind turbines 10a, 10b of the wind farm 42. In an alternative embodiment, the power plant controller 46 adjusts the power generation or production of individual wind turbines 10a, 10b of the wind farm 42.

The control algorithm 72 executing on the power plant controller 46 determines whether the there is an imbalance in the power grid 48 by determining whether the frequency of the power grid 48 has deviated from a desired frequency by more than a predetermined range. As an example, it is generally desired to maintain the frequency of the power grid 48 within a critical range of about 0.5 Hz of its utility frequency (e.g., 50 Hz or 60 Hz). Frequencies outside the critical range generally cause failure of at least a portion of the power grid 48 or damage to electricity conversion and/or electricity consuming devices connected to the power grid 48. As such, the predetermined range in which to maintain the frequency of the power grid 48 from its utility frequency may be the same as or less than the critical range. Alternatively, the predetermined range may be more than the critical range to act as a failsafe for operation of the power grid 48.

Figure 6:
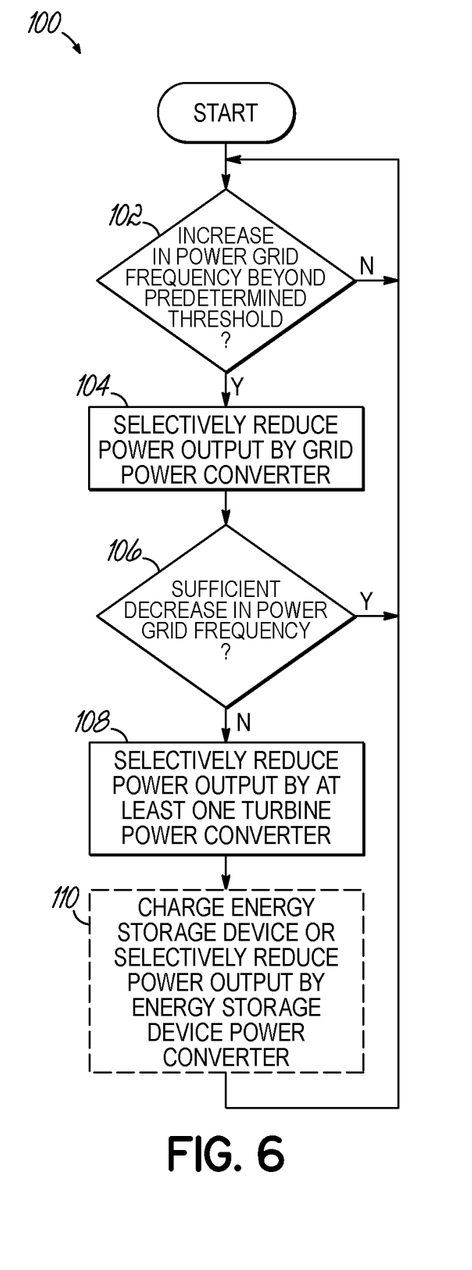
FIG. 6 is a flowchart illustrating a sequence of operations for the power plant controller of FIG. 3 to adjust the power output by the power plant in response to an increase in the frequency of a power grid connected thereto.

FIG. 6 shows a flowchart 100 illustrating a sequence of operations for the power plant controller 46 adjust at least a portion of the power plant 40 in response to detecting an increase in the frequency of the power grid 48. In particular, the power plant controller 46 determines whether there is an increase in the frequency of the power grid 48 beyond a predetermined threshold, such as when there is a sudden withdrawal of load in the power grid 48 or the addition of a wind turbine 10 (block 102). When the power plant controller 46 does not detect an increase in the frequency of the power grid 48 beyond the predetermined threshold ("No" branch of decision block 102), the sequence of operations returns to block 102. However, when the power plant controller 46 does detect an increase in the frequency of the power grid 48 beyond the predetermined threshold ("Yes" branch of decision block 102), the power plant controller 46 selectively reduces the power output by the grid power converter (HVDC link) 56 (block 104), such as by dissipating at least a portion of the HVDC signal in the HVDC link and chopper circuit 88 by level adjusting the HVDC signal to a level that is down to about 30% lower than the normal, rated voltage at which to maintain the HVDC signal in the grid power converter (HVDC link) 56 when the power grid 48 is at its utility frequency.

In some situations, the reduction of the power output by the grid power converter (HVDC link) 56, and thus the decrease in the frequency of the power grid 48, my not be fast enough to prevent failure of at least a portion of the power grid 48 or damage to electricity conversion and/or electricity consuming devices connected to the power grid 48. For example, the reduction of the frequency of the power grid 48 caused by the reduction of the power output by the grid power converter (HVDC link) 56 may not be fast enough to overcome increasing frequency in the power grid 48. Thus, the power plant controller 46 determines whether the frequency of the power grid 48 has sufficiently decreased (block 106). When the decrease in the frequency of the power grid 48 is insufficient ("No" branch of decision block 106), the power plant controller 46 selectively reduces the power output by one or more turbine power converters 34 of one or more respective wind turbines 10 (block 108), such as by dissipating at least a portion of the DC voltage in the DC link and chopper circuit 82 by level adjusting the DC voltage to a level that is down to about 30% lower than the normal, rated voltage at which to maintain the DC voltage in the turbine power converter 34 when the power grid 48 is at its utility frequency. In an optional step, the power plant controller 46 may also charge the energy storage device 50 or selectively reduce the power output by the energy storage device power converter 52 (block 110). After block 108 and/or block 110, the sequence of operations may return to block 102.

Figure 7:
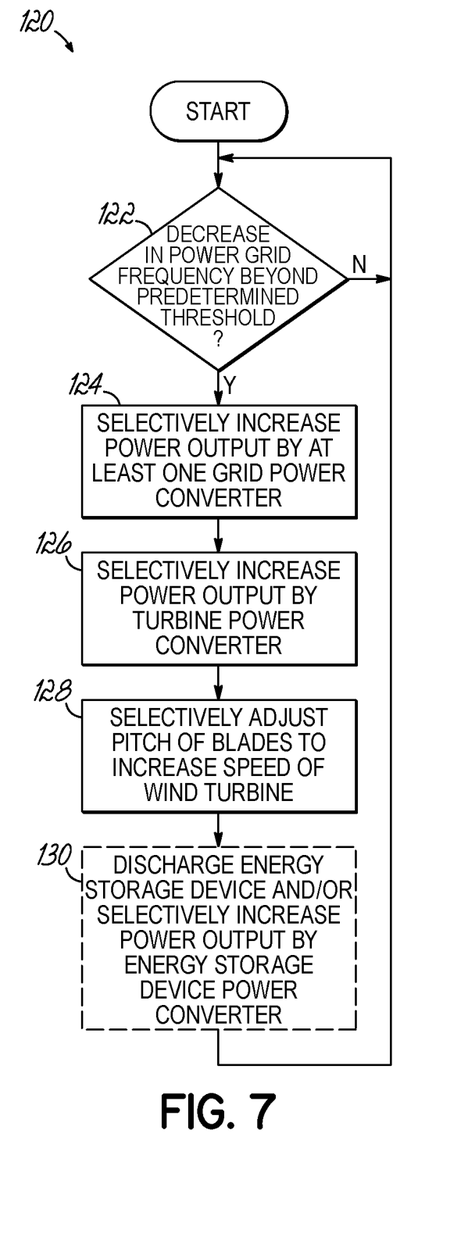
FIG. 7 is a flowchart illustrating a sequence of operations for the power plant controller of FIG. 3 to adjust the power output by the power plant in response to a reduction in the frequency of the power grid connected thereto.

However, when the imbalance is a decrease in the frequency of the power grid 48, the power plant controller is configured to increase the power output by the power plant 40. FIG. 7 shows a flowchart 120 illustrating a sequence of operations for the power plant controller 46 adjust at least a portion of the power plant 40 in response to detecting a decrease in the frequency of the power grid 48. In particular, the power plant controller 46 determines whether there is a decrease in the frequency of the power grid 48 beyond a predetermined threshold, such as when there is a sudden increase of load in the power grid 48, an outage of a wind turbine 10, or a failure of a transmission line from a wind turbine 10 (block 122). When the power plant controller 46 fails to detect a decrease in the frequency of the power grid 48 beyond the predetermined threshold ("No" branch of decision block 122), the sequence of operations returns to block 122.

However, when the power plant controller 46 does detect a decrease in the frequency of the power grid 48 beyond the predetermined threshold ("Yes" branch of decision block 122), the power plant controller 46 selectively increases the power output by the grid power converter (HVDC link) 56 (block 124), selectively increases the power output by at least one turbine power converter 34 (block 126), and selectively changes the pitch of the blades 24 of at least one wind turbine 10 to increase the speed thereof (block 128). In block 124, the power plant controller 46 may selectively increase the power output of the grid power converter (HVDC link) 56 by sending an appropriate command to the grid converter controller 58 for the grid power converter (HVDC link) 56 to reduce the level adjustment of the HVDC signal with the HVDC link and chopper circuit 88 to a level that is up to about 30% higher than the normal, rated voltage at which to maintain the HVDC signal in the grid power converter (HVDC link) 56 when the power grid 48 is at its utility frequency. In block 126, the power plant controller 46 may selectively increase the power output of the turbine power converter 34 by sending an appropriate command to the wind turbine controller 36 for the turbine power converter 34 to reduce the level adjustment of the DC voltage with the DC link and chopper circuit 82 to a level that is up to about 30% higher than the normal, rated voltage at which to maintain the DC voltage in the turbine power converter 34 when the power grid 48 is at its utility frequency. In block 128, the power plant controller 46 may selectively adjust the pitch of the blades 24 by sending an appropriate command to adjust the pitch of the blades 24 to the respective wind turbine controller 36 for the appropriate wind turbine 10 associated with those blades 24. With respect to block 128, the power plant controller 46 may send a command tone or more of the wind turbine controllers 36 such that the wind turbine controllers 36 can subsequently control respective pitch controllers 27 to adjust the pitch of the blades 24 of one or more wind turbines 10 of the wind farm 42. In an optional step, the power plant controller 46 may further increase the power output by the power plant 40 by discharging the energy storage device 50 or selectively increasing the power output by the energy storage device power converter 52 (block 130).

With respect to FIG. 6, the power plant controller 46 selectively reduces the power output by one or more of the power converters 34, 52, 56, as well as charges the energy storage device 50, based upon dynamic measurements of the power output to the power grid 48 and/or dynamic measurements of the frequency of the power grid 48. Similarly, with respect to FIG. 7, the power plant controller 46 selectively increases the power output by one or more of the power converters 34, 52, 56, as well as discharges the energy storage device 50, based upon dynamic measurements of the power output to the power grid 48 and/or dynamic measurements of the frequency of the power grid 48. Correspondingly, embodiments of the invention are configured to address the increase or decrease in the frequency of the power grid 48 to bring that frequency back to about the utility frequency, but are not intended to bring the frequency substantially below or above the utility frequency. Thus, the power plant controller 46 "selectively" reduces or increases power output to the power grid 48 insomuch as that reduction or increase in power output is necessary. For example, and with respect to FIG. 6, when there is enough of a power reduction achieved by reducing the power output by the grid power converter (HVDC link) 56 in block 104, the power plant controller 46 may not reduce the power output by the turbine power converter 34 or the energy storage device power converter 52, or charge the energy storage device 50 in blocks 108 and 110. Also for example, and with respect to FIG. 7, when there is enough of a power increase achieved by increasing the power output by the grid power converter (HVDC link) 56 and increasing the power output by the turbine power converter 34 in blocks 124 and 126, the power plant controller 46 may not discharge the energy storage device 50 or increase the power output by the energy storage device power converter 52 in block 130.

The power plant controller 46 is further configured to adjust the power output by the power converters 34, 52, 56 by about ±30%. Thus, the power plant controller 46 "selectively" reduces or increases power output by the power converters 34, 52, 56 to the power grid 48 insomuch as that reduction or increase in power output is necessary. For example, and with respect to FIG. 6, if the predetermined threshold for an increase in the frequency of the power grid 48 is low (e.g., about 0.01 Hz), the power plant controller 46 reduces the power output by one or more of the power converters 34, 52, 56 an appropriate amount to address the frequency increase. Also for example, and with respect to FIG. 7, if the predetermined threshold for a decrease in the frequency of the power grid is low (e.g., again, about 0.01 Hz), the power plant controller 46 increases the power output by one or more of the power converters 34, 52, 56 an appropriate amount to address the frequency reduction.

Nevertheless, it may be advantageous to utilize adjustments to one or more of the power converters 34, 52, 56 and the pitch of the blades 24 of one or more wind turbines 10 of the wind farm 42 in conjunction. Adjusting the power output of the grid power converter (HVDC link) 56 may be the fastest, as the power plant controller 46 is typically located closest to, or even co-located with, the grid converter system 45. However, a communication delay $t_0$ is often associated with adjustments by the power converters 34 and/or 52. For example, the communication delay $t_0$ corresponds to the time required for the power plant controller 46 to determine whether to adjust the power output by power converters 34 and/or 52, transmit such a command when it is determined to adjust those power converters 34 and/or 52, as well as have the command received and processed by respective controllers 36 and/or 54. The greatest delay, however, is often associated with a combination of the communication delay $t_0$ and a mechanical delay for the pitch controller 27 to control one or more pitch mechanisms 25 to adjust the pitch of the blades 24. This mechanical delay is noted as $t_{WTG}$.

Figure 8:
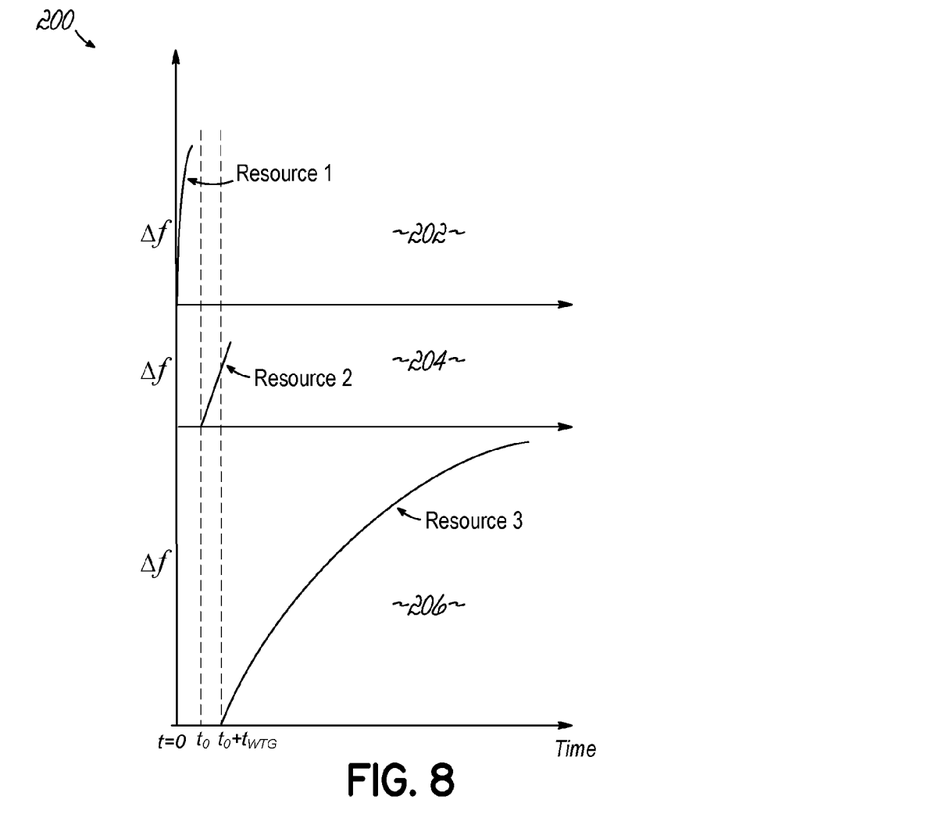
FIG. 8 is a plot showing the separate effects that adjusting the pitch of the blades of the wind turbine of FIGS. 1 and 2, adjusting the power output by the power converter of FIG. 4, and adjusting the power converter of FIG. 5 have on the change in frequency of a power grid, as well as time delays associated therewith.

FIG. 8 shows a combination plot 200 illustrating one example of the response times of adjusting three resources of the power plant 40 and the effect of those response times on the change in frequency of a power grid 48 in response thereto (illustrated as "M"). The first resource (illustrated as "Resource 1") corresponds to a grid power converter (HVDC link) 56. As discussed above, it is often fastest to adjust the power output by the grid power converter (HVDC link) 56, and thus section 202 of the combination plot 200 illustrates the effect that adjusting the grid power converter (HVDC link) 56 may be the quickest and also have a significant impact on the frequency of the power grid 48. The second resource (illustrated as "Resource 2") corresponds to the turbine power converters 34 of the wind turbines 10 of the wind farm 42. As discussed above, there is a communication delay $t_0$ associated with adjusting the power output by turbine power converters 34. Moreover, the total impact of the adjustment of turbine power converters 34 of wind turbines 10 of the wind farm 42 on the frequency of the power grid 48 may be less than the impact from adjustment of the grid power converter (HVDC link) 56. Section 204 of the combination plot 200 therefore illustrates the effect that adjusting the turbine power converters 34 of wind turbines 10 of the wind farm 42 may have on the frequency of the power grid 48. The third resource (illustrated as "Resource 3") corresponds to the pitch of the blades 24 of wind turbines 10 of the wind farm 42. As discussed above, there is a communication delay $t_0$ and a mechanical delay $t_{WTG}$ (e.g., $t_0+t_{WTG}$) associated with causing the pitch controller 27 to change the pitch of the blades 24 of wind turbine 10. The total impact of changing the pitch of the blades 24 of wind turbines 10 of the wind farm 42 also takes the longest amount of time but may have the most impact on the frequency of the power grid 48. Section 206 of the combination plot 200 therefore illustrates the effect that adjusting the pitch of the blades 24 of wind turbines 10 of the wind farm 42 may have on the frequency of the power grid 48.

Figure 9:
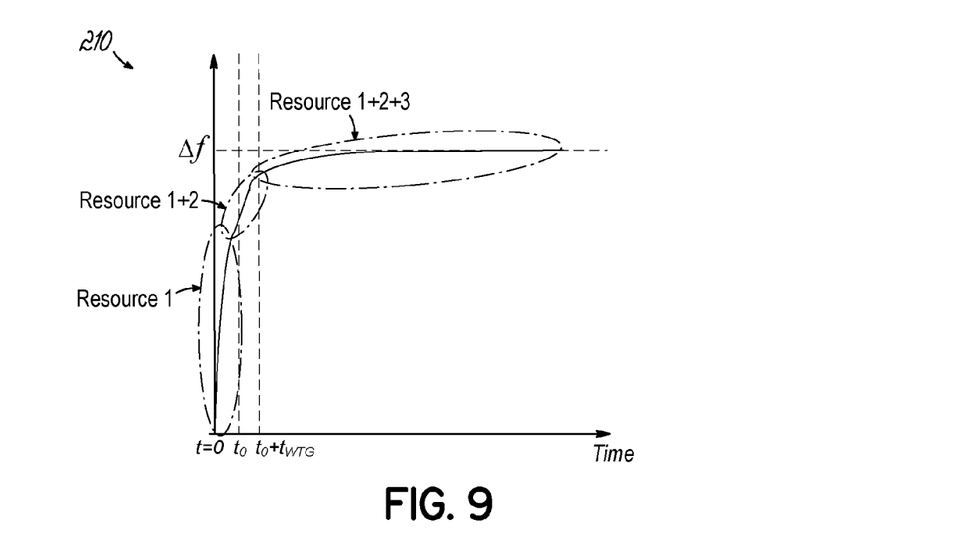
FIG. 9 is a plot showing the combined effects that adjusting the pitch of the blades of the wind turbine of FIGS. 1 and 2, adjusting the power output by the power converter of FIG. 4, and adjusting the power converter of FIG. 5 have on the change in frequency of a power grid over time.

FIG. 9 shows a plot 210 that illustrates one example of the combination of the responses of adjusting all three resources of the power plant 40 in combination and the effect of those adjustments over time on the change in frequency ($\Delta f$) of a power grid 48 in response thereto. As illustrated in FIG. 9, the adjustment of the three resources results in a definitive change in the frequency of the power grid 48 illustrated by the horizontal dashed line at "$\Delta f$". This particular change in the frequency is accomplished by selective adjustment of the three resources by the power plant controller 46. As such, the power plant controller 46 may selectively adjust the power output by the grid power converter (HVDC link) 56 and the turbine power converters 34 of wind turbines 10 of the wind farm 42 to their maximum (e.g., ±30%), but selectively cause the wind turbine controllers 36 and the blade pitch controllers 27 to adjust the pitch of the blades 24 of those wind turbines 10 to achieve the desired level of change in the frequency of the power grid 48.

As will be appreciated by one skilled in the art, the embodiments of the invention may also be embodied in a computer program product embodied in at least one computer readable storage medium having non-transitory computer readable program code embodied thereon. The computer readable storage medium may be an electronic, magnetic, optical, electromagnetic, infrared, or semiconductor system, apparatus, or device, or any suitable combination thereof, that can contain, or store a program for use by or in connection with an instruction execution system, apparatus, or device. Exemplary computer readable storage medium include, but are not limited to, a hard disk, a floppy disk, a random access memory, a read-only memory, an erasable programmable read-only memory, a flash memory, a portable compact disc read-only memory, an optical storage device, a magnetic storage device, or any suitable combination thereof. Computer program code containing instructions for directing a processor to function in a particular manner to carry out operations for the embodiments of the present invention may be written in one or more object oriented and procedural programming languages. The computer program code may supplied from the computer readable storage medium to the processor of any type of computer, such as the processor 66 of the power plant controller 46, to produce a machine with a processor that executes the instructions to implement the functions/acts of a computer implemented process for sensor data collection specified herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "composed of", or variants thereof are used in either the detailed description or the claims, such terms are intended to be inclusive in a manner similar to the term "comprising."

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. For example, any of the blocks of the above flowcharts may be deleted, augmented, made to be simultaneous with another, combined, or be otherwise altered in accordance with the principles of the present invention. For example, and with respect to FIG. 6, the power plant controller 46 may be further configured to change the pitch of the blades 24 of one or more wind turbines 10 in a similar manner as that shown and described with respect to block 128 of FIG. 7. Also with respect to FIG. 6, the power plant controller 46 may be further configured to determine whether to selectively decrease the power output by the grid power converter (HVDC link) 56 (when this option is not the first option to decrease the frequency of the power grid 48, charge the energy storage device 50, and/or selectively reduce the power output by the energy storage device power converter 52 is necessary by determining whether there has been sufficient decrease in the frequency of the power grid 48 in a similar manner as that shown and described with respect to block 106. Moreover, and with respect to FIG. 7, the power plant controller 46 may be further configured to determine whether to selectively increase the power output by the grid power converter (HVDC link) 56 (when this option is not the first option to increase the frequency of the power grid 48), selectively increase the power output by the turbine power converter 34, selectively adjust the pitch of the blades 24 of one or more wind turbines 10, discharge energy from the energy storage device 50, and/or selectively increase the power output by the energy storage device power converter 52 by determining whether there has been sufficient increase in the frequency of the power grid 48.

Thus, the invention in its broader aspects is therefore not limited to the specific details, representative methods, and illustrative examples shown and described. Accordingly, departures may be made from such details without departing from the spirit or scope of applicant's general inventive concept.

What is claimed is:

1. A power plant for controlling power output to a power grid, the power plant comprising:
  a wind farm including a plurality of wind turbines configured to generate and output a wind farm power signal to a point of common connection, each wind turbine of the plurality of wind turbines including
    a pitch mechanism to change a pitch of blades of the respective wind turbine of the plurality of wind turbines, and
    a turbine power converter to output a portion of the wind farm power signal generated by the respective wind turbine;
  a grid power converter connected to the point of common connection and configured to receive the wind farm power signal and output a power signal for the power grid;
  a sensor to measure a frequency of the power grid; and
  a supervisory controller coupled in communication with each of the plurality of wind turbines of the wind farm, the grid power converter, and the sensor, the supervisory controller configured to implement a control algorithm to dynamically adjust the power signal in response to the frequency measured by the sensor dropping below a first target frequency by:
    changing the pitch of the blades of at least one respective wind turbine of the wind farm,
    increasing a level of the portion of the wind farm power signal output by the turbine power converter of at least one respective wind turbine of the wind farm, and
    increasing a level of the power signal output by the grid power converter.

2. The power plant of claim 1, wherein the grid power converter further comprises:
  a chopper circuit having a gain that is dynamically adjustable for increasing the level of the power signal output by the grid power converter.

3. The power plant of claim 1, wherein the turbine power converter further comprises:
  a chopper circuit having a gain that is dynamically adjustable for increasing the level of the portion of the wind farm power output by the turbine power converter of at least one respective wind turbine of the wind farm.

4. The power plant of claim 1, further comprising:
  an energy storage system with an energy storage device, the energy storage system connected to the point of common connection to be charged by the wind farm power signal,
  wherein the control algorithm is further configured to charge the energy storage device in response to the frequency measured by the sensor dropping below the first target frequency.

5. The power plant of claim 1, further comprising:
  an energy storage system with an energy storage device and an energy storage device power converter, the energy storage device power converter configured to output an energy storage system power signal to the point of common connection,
  wherein the control algorithm is further configured to increase a level of the energy storage system power signal output by the energy storage device power converter in response to the frequency measured by the sensor dropping below the first target frequency.

6. The power plant of claim 1, wherein the control algorithm is further configured to dynamically adjust the power signal in response to the frequency measured by the sensor rising above a second target frequency by decreasing the level of the power signal output by the grid power converter.

7. The power plant of claim 6, wherein the grid power converter further comprises:
  a chopper circuit having a gain that is dynamically adjustable for decreasing the level of the power signal output by the grid power converter.

8. The power plant of claim 6, wherein the control algorithm is further configured to dynamically adjust the power signal in response to the frequency measured by the sensor rising above the second target frequency by changing the pitch of the blades of at least one respective wind turbine of the wind farm and decreasing the level of the portion of the wind farm power signal output by the turbine power converter of at least one respective wind turbine of the wind farm.

9. The power plant of claim 8, wherein the turbine power converter further comprises:
  a chopper circuit having a gain that is dynamically adjustable for decreasing the level of the portion of the wind farm power signal output by the turbine power converter of at least one respective wind turbine of the wind farm.

10. The power plant of claim 1, wherein the control algorithm is further configured to increase the level of the power signal output by the grid power converter before changing the pitch of the blades of the at least one respective wind turbine of the wind farm or increasing the level of the portion of the wind farm power signal output by the turbine power converter of the at least one respective wind turbine of the wind farm.

11. The power plant of claim 1, wherein the control algorithm is further configured to dynamically adjust the power signal output by the grid power converter to bring the frequency of the power grid to a utility frequency associated therewith.

12. The power plant of claim 1, wherein the grid power converter electrically couples the point of common connection to the power grid.

13. The power plant of claim 1, wherein the supervisory controller implements the control algorithm to dynamically adjust the power signal in response to a desired change in the frequency measured by the sensor by selectively adjusting in parallel:
the pitch of the blades of at least one respective wind turbine of the wind farm,
the level of the portion of the wind farm power signal output by the turbine power converter of at least one respective wind turbine of the wind farm, and
the level of the power signal output by the grid power converter.

14. A computer-implemented method for controlling power output by a power plant to a power grid, the power plant including a grid power converter connected to a point of common connection, the grid power converter receiving a wind farm power signal from a wind farm and outputting a power signal for the power grid, the method comprising:
in response to a measured frequency of the power grid dropping below a first target frequency, using a control algorithm to dynamically adjust the power signal by changing a pitch of blades of at least one respective wind turbine of the wind farm, increasing a level of a portion of the wind farm power signal output by a turbine power converter of at least one respective wind turbine of the wind farm, and increasing a level of the power signal output by the grid power converter.

15. The computer-implemented method of claim 14, wherein increasing the level of the power signal output by the grid power converter comprises:
increasing a dynamically adjustable gain of a chopper circuit of the grid power converter.

16. The computer-implemented method of claim 14, wherein increasing the level of the portion of the wind farm power output by the turbine power converter of at least one respective wind turbine of the wind farm comprises:
increasing a dynamically adjustable gain of a chopper circuit of the turbine power converter.

17. The computer-implemented method of claim 14, wherein the power plant includes an energy storage system with an energy storage device configured to be charged by the wind farm power signal, and using the control algorithm to dynamically adjust the power signal comprises:
charging the energy storage device in response to the measured frequency dropping below the first target frequency.

18. The computer-implemented method of claim 14, wherein the power plant includes an energy storage system with an energy storage device and an energy storage device power converter configured to output an energy storage system power signal to the grid power converter, and wherein using the control algorithm to dynamically adjust the power signal comprises:
increasing a level of the energy storage system power signal output by the energy storage device power converter in response to the measured frequency dropping below the first target frequency.

19. The computer-implemented method of claim 14, further comprising:
in response to the measured frequency rising above a second target frequency, using the control algorithm to dynamically adjust the power signal by decreasing the level of the power signal output by the grid power converter.

20. The computer-implemented method of claim 19, further comprising:
decreasing a dynamically adjustable gain of a chopper circuit of the grid power converter.

21. The computer-implemented method of claim 19, further comprising:
changing the pitch of the blades of at least one respective wind turbine of the wind farm; and
decreasing the level of the portion of the wind farm power signal output by the turbine power converter of at least one respective wind turbine of the wind farm.

22. The computer-implemented method of claim 21, wherein decreasing the level of the portion of the wind farm power output by the turbine power converter of at least one respective wind turbine of the wind farm comprises:
decreasing a dynamically adjustable gain of a chopper circuit of the turbine power converter of the at least one respective wind turbine of the wind farm.

23. The computer-implemented method of claim 14, wherein the control algorithm is further configured to increase the level of the power signal output by the grid power converter before changing the pitch of the blades of the at least one respective wind turbine of the wind farm or increasing the level of the portion of the wind farm power signal output by the turbine power converter of the at least one respective wind turbine of the wind farm.

24. The computer-implemented method of claim 14, wherein using the control algorithm to dynamically adjust the power signal comprises:
adjusting the power signal to bring the frequency of the power grid to a utility frequency associated therewith.

25. A computer program product comprising:
a computer readable storage medium; and
program instructions for executing an operation for controlling power output by a power plant to a power grid, the power plant including a grid power converter connected to a point of common connection, the grid power converter receiving a wind farm power signal from a wind farm and outputting a power signal for the power grid, the operation comprising:
in response to a measured frequency of the power grid dropping below a first target frequency, using a control algorithm to dynamically adjust the power signal by changing a pitch of blades of at least one respective wind turbine of the wind farm, increasing a level of a portion of the wind farm power signal output by a turbine power converter of at least one respective wind turbine of the wind farm, and increasing a level of the power signal output by the grid power converter,
wherein the program instructions are stored on the computer readable storage medium.

* * * * *